United States Patent [19]

Sasaki et al.

[11] Patent Number: 5,084,349
[45] Date of Patent: Jan. 28, 1992

[54] HOLLOW CELLULOSE FIBERS, METHOD FOR MAKING, AND FLUID PROCESSING APPARATUS USING SAME

[75] Inventors: Masatomi Sasaki; Hirotomo Morita; Hiroki Sakakibara; Makoto Saruhashi, all of Fuji; Yutaka Matsumoto, Fujinomiya, all of Japan

[73] Assignee: Terumo Kabushiki Kaisha, Tokyo, Japan

[21] Appl. No.: 403,354

[22] Filed: Sep. 6, 1989

[30] Foreign Application Priority Data

Sep. 7, 1988 [JP] Japan .................. 63-223751

[51] Int. Cl.$^5$ .............................................. D02G 3/00
[52] U.S. Cl. ..................... 428/398; 210/500.21; 210/500.23; 428/376
[58] Field of Search ................ 428/398, 376; 210/500.21, 500.23, 500.30, 321.6, 646

[56] References Cited

U.S. PATENT DOCUMENTS

| 4,342,711 | 8/1982 | Joh et al. ............. 428/398 X |
| 4,388,256 | 6/1983 | Ishida et al. ........... 428/398 X |
| 4,444,663 | 4/1984 | Aoyagi et al. .......... 428/398 X |
| 4,444,716 | 4/1984 | Aoyagi et al. . |
| 4,459,210 | 7/1984 | Murakami et al. ....... 428/398 X |
| 4,834,882 | 5/1989 | Kataoka et al. ......... 210/500.23 X |

FOREIGN PATENT DOCUMENTS

| 0008536 | 3/1980 | European Pat. Off. . |
| 0135593 | 4/1985 | European Pat. Off. . |
| 0175948 | 4/1986 | European Pat. Off. . |
| 249189 | 12/1987 | European Pat. Off. . |
| 57-71409 | 2/1982 | Japan . |
| 57-71408 | 5/1982 | Japan . |
| 2086798 | 5/1982 | United Kingdom . |

Primary Examiner—Lorraine T. Kendell
Attorney, Agent, or Firm—Burns, Doane, Swecker & Mathis

[57] ABSTRACT

The cellulosic hollow-fiber membranes of the invention are useful in fluid processing apparatus typically for artificial dialysis. Each fiber has a tubular microporous wall having micropores and defining a lumen. The micropores have an average pore diameter of about 55 to about 300 Å. The cellulosic hollow fibers exhibit a percent removal of $\beta_2$-microglobulin through adsorption of up to 10% after a solution of 20 mg/l of $\beta_2$-microglobulin in water is circulated through the fiber lumen for 3 hours. They also exhibit a sufficient filtration fraction of $\beta_2$-microglobulin and a ultrafiltration rate to remove $\beta_2$-microglobulin from blood predominantly through filtration while preventing contamination of the membranes with $\beta_2$-microglobulin due to adsorption and controlling the amount of water removed from the blood. The fibers are prepraed by wet spinning a cellulosic spinning dope into a hollow fiber followed by washing, heat treatment, plasticizing, and drying.

2 Claims, 5 Drawing Sheets

HOLLOW CELLULOSE FIBERS, METHOD FOR MAKING, AND FLUID PROCESSING APPARATUS USING SAME

BACKGROUND OF THE INVENTION

1. Field of the Invention

This invention relates to hollow cellulose fibers adapted for use in artificial dialysis, a method for making the same, and a fluid processing apparatus using the same.

2. Discussion of the Prior Art

The modern treatment for renal disease has marked a great advance due to the development of artificial kidney apparatus utilizing dialysis and ultrafiltration. Those patients whose kidney function is damaged or lost can survive for 10 years or more by virtue of artificial kidney apparatus. Nevertheless, they suffer from various complicating diseases inherent to long-term chronic renal insufficiency.

To avoid such complicating diseases, various attempts have been made to remove middle to high molecular weight substances from blood. Since the discovery that carpal tunnel syndrome, one of complicating diseases, is caused by the presence of $\beta_2$-microglobulin (molecular weight 11,800) in blood, efforts have been focused on the effective removal of $\beta_2$-microglobulin from blood.

Dialysis membranes are often used for removing $\beta_2$-microglobulin from blood. One example is disclosed in Japanese Patent Application Kokai No. 109871/1988 "Hemodialysis Membrane." The disclosed hemodialysis membrane is characterized by a total protein permeability of up to 0.2% and a percent removal of $\beta_2$-microglobulin of at least 5%. Upon hemodialysis, the hemodialysis membrane can selectively remove $\beta_2$-microglobulin from various proteins in blood.

However, the previously proposed hemodialysis membrane has several drawbacks. First, the membrane which is most preferably formed of polymethyl methacrylate (PMMA) tends to adsorb $\beta_2$-microglobulin. As a consequence, the dialysis membrane is contaminated to lose its function with a lapse of service time. Also the membrane lowers its ultrafiltration factor with a lapse of time due to clogging.

Secondly, the previously proposed dialysis membrane removes excess amount of water from blood when assembled in an artificial dialyzer designed to carry out ultrafiltration, that is, to remove water from blood utilizing the differential pressure between the blood side and the dialysate side (under negative pressure). Accordingly, an increased amount of fluid such as physiological saline must be replenished against the general demand that the amount of physiological saline admitted into the body should be controlled as small as possible. An increased amount of such complemental fluid, of course, adds to the expense. Although it is possible to control the pressure of dialysate in the dialyzer for reducing the amount of water removed using a UFR controller, there often occurs a phenomenon known as back-filtration that pyrogen in the dialysate migrates into blood, imposing a danger to the patient.

SUMMARY OF THE INVENTION

Therefore, an object of the present invention is to eliminate the above-mentioned problems of the prior art and to provide a novel and improved hollow cellulose fiber which is free of contamination through adsorption with $\beta_2$-microglobulin to be removed from blood while minimizing the amount of water removed from blood.

Another object of the present invention is to provide a fluid processing apparatus using such hollow cellulose fibers.

A further object of the present invention is to provide a method for making such hollow cellulose fibers.

According to a first aspect of the present invention, there is provided a hollow cellulose fiber comprising a tubular microporous wall having outer and inner surfaces and micropores therein and defining a lumen. The micropores at the inner surface have an average pore diameter of about 55 to about 300 Å. The fiber exhibits a percent removal of $\beta_2$-microglobulin through adsorption of up to 10% after a solution of 20 mg/l of $\beta_2$-microglobulin in water is circulated through the fiber lumen for 3 hours.

Preferably, the hollow cellulose fiber has a thickness of from 5 to 30 $\mu$m between the outer and inner surfaces. The fiber exhibits a filtration fraction of $\beta_2$-microglobulin of at least 45% and a ultrafiltration rate of up to 20 ml/mmHg.hr.m$^2$.

According to a second aspect of the present invention, there is provided a fluid processing apparatus wherein a multiplicity of hollow cellulose fibers as defined above are received in a housing. The fluid processing apparatus is best suited as an artificial dialyzer.

According to a third aspect of the present invention, there is provided a method for preparing a hollow cellulose fiber, comprising the steps of spinning a cellulose spinning dope into a hollow shape through an annular spinneret while introducing a non-coagulating liquid into the bore of the hollow shape, passing the hollow shape through a coagulating liquid, causing the hollow shape to coagulate and regenerate into a hollow fiber, washing the fiber, plasticizing the fiber, and drying the fiber.

According to the feature of the present invention, the spinning dope has a viscosity of 100 to 800 poise at 20° C.

The method may further include a step of heat treating the washed fiber prior to the plasticizing step.

The method may further include steps of preparing a cellulose solution and diluting the cellulose solution with a diluent to form a cellulose spinning dope.

In a preferred embodiment, the spinning dope is a cuprammonium cellulose solution. The step of passing the hollow shape through a coagulating liquid, causing the hollow shape to coagulate and regenerate into a hollow fiber includes maintaining the hollow shape or the spinning dope at a temperature of 5° to 25° C. Preferably, the washing step includes pickling with an aqueous sulfuric acid solution containing 3 to 15% by volume of sulfuric acid.

Preferably, the heat treatment includes contacting the fiber with a heating fluid. The heat treatment is at a temperature of 40° to 120° C.

Preferably, water is used as the diluent for diluting the cellulose solution.

The hollow cellulose fibers according to the present invention find major application in the medical field for artificial dialysis and other purposes, but their utility is not limited thereto. They may be used in a variety of fields for a variety of purposes of processing fluid, for example, as membranes for selectively removing a particular substance from fluid and membranes for concentrating blood.

BRIEF DESCRIPTION OF THE DRAWINGS

The above and other objects, features, and advantages of the present invention will be better understood from the following description taken in conjunction with the accompanying drawings, in which.

Like parts are designated by the same reference numerals throughout the figures.

DESCRIPTION OF THE PREFERRED EMBODIMENTS

Figure 1:
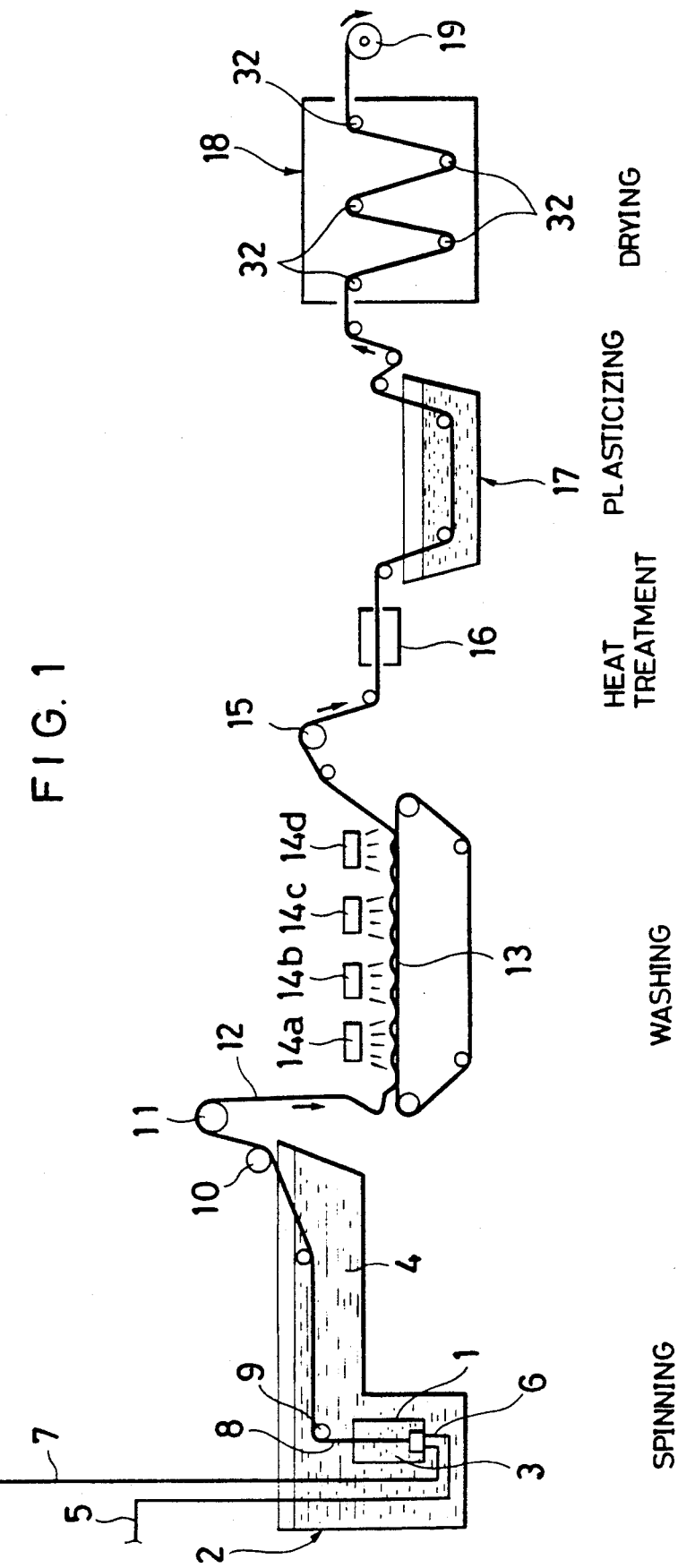
FIG. 1 schematically illustrates a system for manufacturing a hollow fiber according to the method of the invention.

The hollow cellulose fibers of the present invention are first described in detail.

Hollow fibers

The hollow fibers may be formed from celluloses such as cuprammonium cellulose and cellulose acetate, with the cuprammonium cellulose being preferred. A variety of celluloses may be used although those celluloses having an average degree of polymerization of about 500 to about 2,500 are preferred.

Suitable cuprammonium cellulose solutions are disclosed in Japanese Patent Application Kokai Nos. 71408/1982, 71409/1982, 71410/1982, 71411/1982, and 199808/1982.

According to the invention, the hollow cellulose fibers preferably have a filtration fraction or sieving factor of $\beta_2$-microglobulin of at least 45%, more preferably 47 to 95%, most preferably 50 to 90%. Fibers with a filtration fraction of $\beta_2$-microglobulin of less than 45% would remove only a smaller percentage of $\beta_2$-microglobulin or the substance to be removed for the clinical treatment, often failing to achieve a clinically satisfactory result. The higher the filtration fraction of $\beta_2$-microglobulin, the more effective becomes the treatment, but inducing an undesirable increase of ultrafiltration rate and an increased removal of a useful protein, albumin. For this reason, the upper limit of filtration fraction of $\beta_2$-microglobulin is preferably set at about 95%. The term filtration fraction of $\beta_2$-microglobulin is determined by preparing a solution containing 20 mg of $\beta_2$-microglobulin in 1 liter of water or physiological saline, circulating the solution at a flow rate of 10 ml/min. under a trans-membrane pressure (TMP) of 100 mmHg for one hour, and calculating the filtrate concentration/inlet concentration ratio in percent after one hour.

According to the invention, the hollow cellulose fibers should have a percent removal of $\beta_2$-microglobulin through adsorption of up to 10%, more preferably up to 5% after a solution of 20 mg/l of $\beta_2$-microglobulin in water is circulated through the fiber lumen for 3 hours. If the removal through adsorption exceeds 10%, then an increased amount of $\beta_2$-microglobulin is adsorbed in micropores of the hollow fiber membranes, which are thus contaminated.

The removal of $\beta_2$-microglobulin from blood largely depends on two mechanisms, removal through adsorption to hollow fiber membranes and removal through penetration through hollow fiber membranes. The percent removal through adsorption is determined by preparing 30 ml of an aqueous solution containing 20 mg/liter of $\beta_2$-microglobulin, circulating the solution through a module having a membrane surface area of 100 m$^2$ for a predetermined time of three hours under conditions causing no filtration, that is, under a controlled pressure to give a trans-membrane pressure of zero, measuring the $\beta_2$-microglobulin concentration of the solution, and calculating (initial concentration-concentration after 3 hours)/initial concentration in percent.

The hollow cellulose fibers preferably have a percent removal of $\beta_2$-microglobulin through adsorption of up to 10%, most preferably 5% after a solution of 20 mg/l of $\beta_2$-microglobulin in water is circulated through the fiber lumen for 5 hours.

According to the invention, the hollow cellulose fibers preferably have a ultrafiltration rate of up to 20 ml/mmHg.hr.m$^2$, more preferably 5 to 18 ml/mmHg.hr.m$^2$. A higher ultrafiltration rate is uneconomical because a more amount of water is removed from blood and thus, a more amount of replenisher fluid such as physiological saline must be supplemented against the general demand that the amount of physiological saline admitted into the body should be controlled as small as possible. If a UFR controller is used to control the pressure of dialysate in the dialyzer for reducing the amount of water removed, there often occurs a phenomenon known as back filtration that pyrogen in the dialysate migrates into blood, undesirably contaminating the blood. Therefore, the ultrafiltration rate of hollow fiber membranes is limited to 20 ml/mmHg.hr.m$^2$ or lower.

The hollow cellulose fibers of the invention each are of an open structure comprising a tubular microporous wall having outer and inner surfaces and numerous micropores in the form of through pores therein, with the inner surface defining an axial lumen. A dense or active layer where the majority of micropores governing material transfer across the wall are concentrated extends at least a portion of the thickness, desirably throughout the thickness. The dense layer substantially governs the material permeability through hollow fiber membranes, especially the permeability of low molecular weight proteins. The hollow fiber membranes may be either uniform membranes or asymmetric membranes.

The micropores have an average pore diameter of about 55 to about 300 Å at the inner surface. The percent removal of low molecular weight proteins (molecular weight 10,000–50,000) such as $\beta_2$-microglobulin is drastically reduced with an average pore diameter of smaller than 55 Å, whereas an increased proportion of useful proteins such as albumin (molecular weight 66,000) will pass over with an average pore diameter of larger than 300 Å.

The preferred method for measuring the average diameter of pores involves taking a high magnification electron photomicrograph of a dense layer on the inner surface, carrying out image analysis, determining pore areas A, calculating equivalent circle diameters according to $R = \sqrt{4A/\pi}$, and calculating an average pore diameter therefrom.

Each of the hollow fibers of the invention is composed of a tubular microporous wall having a radial thickness between the outer and inner surfaces. The fibers preferably have an inner diameter of 180 to 300 μm, more preferably 180 to 250 μm. The thinner the thickness of the fiber wall, advantageously the higher becomes the diffusibility of low molecular weight proteins. However, a too thin wall is low in strength. Therefore, the wall thickness is preferably in the range of from 5 to 30 μm, more preferably from 8 to 15 μm for improved dialysis performance.

Dialyzer

Figure 7:
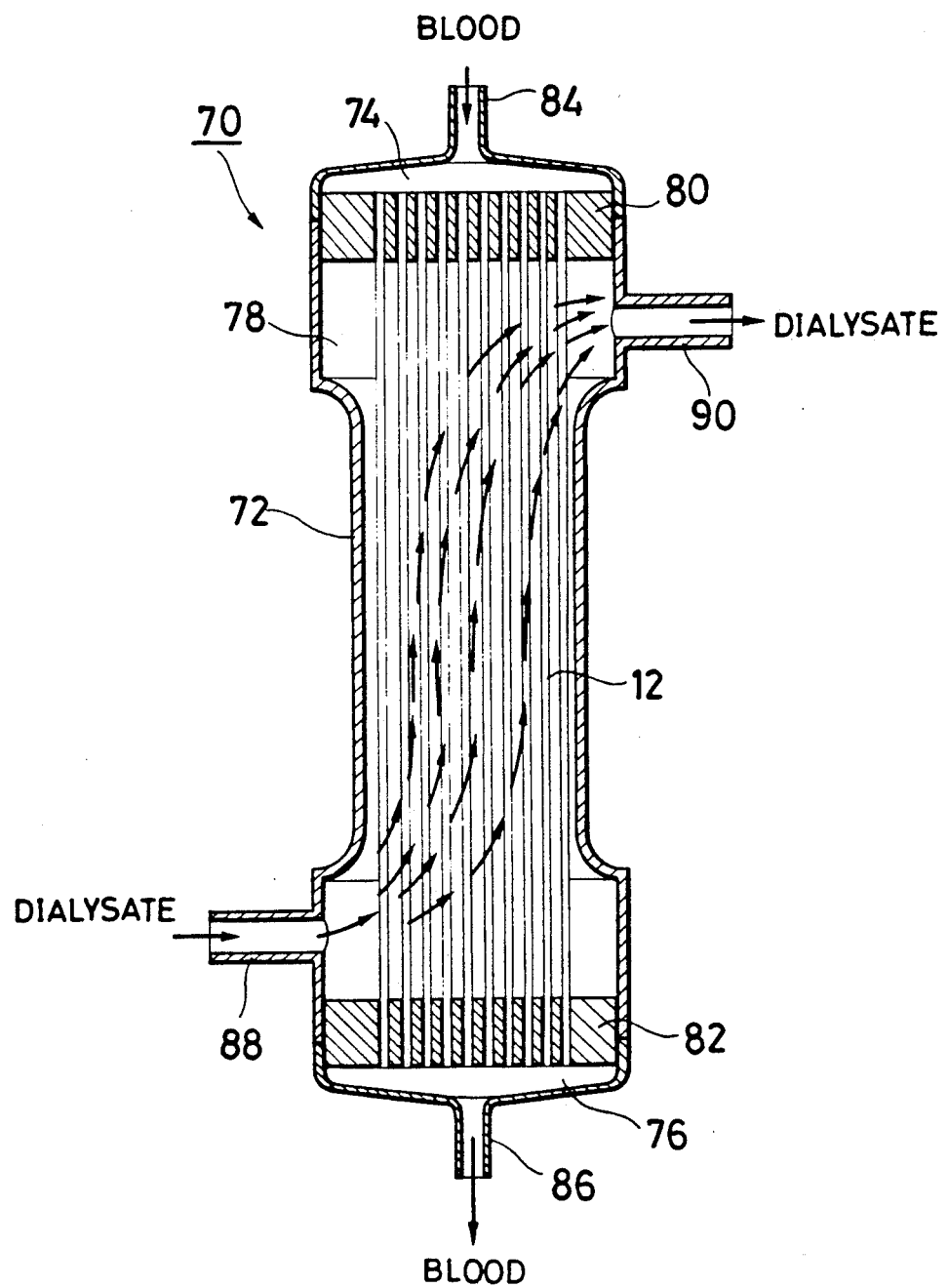
FIG. 7 is a schematic axial cross section of a dialyzer.

Now a fluid processing apparatus, typically an artificial dialyzer, using a multiplicity of hollow cellulose fibers as defined above will be described with reference to FIG. 7.

The artificial dialyzer generally designated at 70 includes a housing 72 defining first and second blood chambers 74 and 76 at axially opposed ends and a dialysate chamber 78 between the blood chambers. The dialysate chamber is separated from the blood chambers by partitions 80 and 82. A bundle of numerous, typically about 5,000 to about 10,000 hollow fibers 12 as defined above cut to an appropriate length, typically an effective length of about 170 to about 250 mm is received in the housing 72. The fiber bundle extends across the dialysate chamber 78 and penetrates through the partitions 80 and 82 at the opposite ends such that the first and second blood chambers are in fluid communication through the bores of the hollow fibers. The housing is further provided with blood inlet and outlet ports 84 and 86 in fluid communication with the first and second blood chambers and dialysate inlet and outlet ports 88 and 90 in fluid communication with the dialysate chamber.

The artificial dialyzer is inserted in a blood circuit including a chamber, a roller pump and other necessary components connected through lines of tubing. The dialyzer can be considered as dividing the circuit into upstream and downstream sides. Blood from the upstream side of the circuit enters the first blood chamber 74 through the blood inlet port 84, passes through the hollow fiber bores to the second blood chamber 76, and goes back to the circuit on the downstream side through the blood outlet port 86. A dialysate under negative pressure is fed to the dialysate inlet port 88 from a dialysate circuit, introduced into the dialysate chamber 78 where the dialysate contacts the outer circumference surface of hollow fibers 12, and then discharged through the dialysate outlet port 90.

Dialysis takes place on the blood through the hollow fiber membranes during passage through the fiber bores. That is, low molecular weight proteins, especially $\beta_2$-microglobulin are removed from the blood and at the same time, water is removed by ultrafiltration.

Except the hollow fibers, the construction of the artificial dialyzer disclosed herein may be in accord with the prior art structures as disclosed in, for example, Japanese Patent Application Kokai Nos. 30990/1978, 48395/1978, 116355/1980, and 82868/1984, and Japanese Utility Model Publication No. 21399/1981.

Method

Japanese Patent Application Kokai No. 146306/1986 discloses a method for preparing hollow cellulose fibers. However, this method is unsuccessful in preparing hollow cellulose fibers having an average pore diameter and removal of $\beta_2$-microglobulin as defined in the present invention because no attention is paid to the viscosity of the spinning dope, heat treatment of fibers or dilution of a cellulose solution, The method for preparing hollow cellulose fibers according to the present invention will be described.

Briefly stated, the method for preparing a hollow cellulose fiber involves five steps of: (i) spinning, (ii) washing, (iii) heat treatment, (iv) plasticizing, and (v) drying.

i) Spinning Step

The first step is to spin a spinning dope into a hollow fiber by a spinning technique as will be described later.

The spinning dope may be selected from cellulosic spinning dopes such as cuprammonium cellulose solution and cellulose acetate solution, with the cuprammonium cellulose solution being preferred.

The cuprammonium cellulose solution may be prepared by a conventional process. For example, aqueous ammonia, basic copper sulfate solution, and water are first mixed to form an aqueous copper ammonium solution. Then an antioxidant such as sodium sulfite is added and cellulose stock material is admitted to the solution, which is agitated for dissolving. An aqueous sodium hydroxide solution is finally added to completely dissolve the undissolved cellulose, obtaining a cuprammonium cellulose solution. The cellulose solution prepared in this way is ready for use as a spinning dope with or without dilution with a diluent.

The spinning dope may preferably have a viscosity of about 100 to 800 P (poise), more preferably about 150 to about 500 P at a temperature of 20° C. The lower the viscosity of spinning dope, the higher becomes the permeability of middle to high molecular weight substances in blood through the resulting hollow fiber membrane. A spinning dope with a viscosity of lower than 100 P has a spinning. If the viscosity exceeds 800 P, the resulting hollow fiber membrane will often exhibit insufficient permeability of middle to high molecular weight substances in blood, especially $\beta_2$-microglobulin. The spinning dope may be controlled to a viscosity within the above-defined range by adjusting the cellulose concentration, for example, to a level of 4.5 to 7.8% by volume, and the temperature.

Dilution of a cellulose solution is preferred for process control because the dilution can form a spinning dope having a well controlled viscosity. The diluent used herein is selected from those compatible with the cellulose solution, for example, water, aqueous cuprammonium solution, tetrahydrofuran, dioxane, and chloroform. Water is especially preferred because of safety and ease of operation. The addition of water after having dissolved cellulose brings about a change in structure such as pore diameter distribution of the finally produced fiber. The secondary dilution advantageously presents ease of control of quality in that the viscosity of spinning dope can be precisely controlled.

A variety of spinning processes may be employed herein, for example, an air drop process; a process as disclosed in Japanese Patent Application Kokai Nos. 71408/1982 and 71410/1982 wherein the dope is discharged into a non-coagulating liquid and passed along the interface between the non-coagulating liquid membrane and a coagulating liquid; a process as disclosed in Japanese Patent Application Kokai No. 71409/1982 wherein the dope is discharged into a non-coagulating liquid and then passed through a coagulating liquid; a process as disclosed in Japanese Patent Application Kokai No. 71411/1982 wherein the dope is discharged while it is being surrounded by a non-coagulating liquid and then coagulated and regenerated; and a process as disclosed in Japanese Patent Application Kokai No. 199808/1982 wherein a tank is filled with coagulating liquid as an upper layer and non-coagulating liquid consisting of halogenated hydrocarbon as a lower layer, and the dope is discharged into the non-coagulating liquid through an annular spinneret while introducing non-coagulating liquid into the central bore, and then passed through the coagulating liquid for solidification and regeneration (this process is referred to as floating process, hereinafter). Since the last mentioned floating process is particularly preferred, the method of the invention is illustrated in conjunction with the drawings by referring to the floating process as a typical process.

Referring to FIG. 1, there is schematically illustrated a system for preparing a hollow fiber according to the method of the invention.

The system includes a tub 2 in which an inner tank 1 is placed near its bottom. A non-coagulating liquid 3 having non-coagulating or non-coagulating nature with respect to the cellulose spinning dope is introduced into the inner tank 1 while the tub 2 is filled with a coagulating liquid 4 having a lower specific gravity than the non-coagulating liquid 3 and coagulating or coagulating nature with respect to the cellulose spinning dope. Then two layers are formed in the tub 2, that is, the non-coagulating liquid 3 in the inner tank 1 and the coagulating liquid 4 form lower and upper layers in the tub 2, respectively. The inner tank 1 is equipped at the bottom with a spinneret assembly 6 having an annular spinneret (not shown) directed upward.

The non-coagulating liquid 3 may be a halogenated hydrocarbon such as trichlorotrifluoroethane and tetrachloroethylene. The coagulating liquid 4 may be a solution of sodium hydroxide, potassium hydroxide, and lithium hydroxide, for example.

The spinning dope is pumped from a reservoir (not shown) to the spinneret assembly 6 through a conduit 5 and directly extruded into the non-coagulating liquid or lower layer 3 through the annular spinneret to form an annular hollow shape 8. During extrusion, another non-coagulating liquid having non-coagulating nature with respect to the spinning dope is pumped from a reservoir (not shown) to the spinneret assembly 6 through a conduit 7 and introduced into the central bore of the hollow shape 8 as an internal fluid. Therefore, the non-coagulating liquids are present both outside and inside the wall of the hollow shape 8 of spinning dope travelling within the confine of the inner tank 1.

The internal non-coagulating liquid is preferably selected from isopropyl myristate, isoamyl acetate, and isopropyl palmitate, for example.

The hollow shape 8 of spinning dope as extruded through the annular spinneret moves upward through the non-coagulating liquid or lower layer 3 without coagulating while entraining the internal non-coagulating liquid in its bore. At this point, the hollow shape 8 rises upward under the buoyancy due to the differential specific gravity between the spinning dope and the external non-coagulating liquid in the inner tank.

The hollow shape 8 of spinning dope then enters the coagulating liquid or upper layer 4 and travels a sufficient distance through the coagulating liquid 4 by turning around horizontally extending rods 9 arranged in the tub 2 under the surface of coagulating liquid 4. The hollow shape 8 of spinning dope is coagulated and regenerated during its travel through the coagulating liquid. Then the resulting fiber is taken out of the tub 2 via a roller 10.

The spinning dope is preferably maintained at a temperature of 5° to 25° C. when it is extruded through the spinneret and passed through the coagulating liquid 4. The spinning dope increases its viscosity to increase spinning stability as the temperature lowers. However, if the temperature of the spinning dope is lower than 5° C., the non coagulating liquid filled inside the hollow shape 8 of spinning dope would probably freeze, causing irregularities on the inside surface of the resulting hollow fiber membrane. A spinning dope temperature of higher than 25° C. is disadvantageous for the manufacturing or spinning process because the hollow shape 8 would be often torn or broken.

To maintain the spinning dope at a temperature within the above-defined range, the tub 2 may be placed in a constant temperature enclosure (not shown) or provided with a heater (not shown), for example.

ii) Washing Step

As shown in FIG. 1, the hollow fiber 12 taken out of the coagulating liquid 4 via the roller 10 is turned downward via a drive roller 11 and then fed to a washing station. Washing units are arranged in series above a conveyor device in the form of a belt conveyor 13. More particularly, the washing station includes an alkali washing unit 14a, a first water washing unit 14b, a pickling or acid washing unit 14c, and a second water washing unit 14d, all units carrying out shower washing. During passage through the washing station, the fiber 12 is successively subjected to re-solidification, water washing, copper removal, and water washing.

In the case of cuprammonium cellulose hollow fibers, the pickling unit 14c usually uses an aqueous sulfuric acid solution as the pickling solution, with a sulfuric acid concentration of 3 to 15% by volume being preferred. A sulfuric acid concentration of less than 3% by volume would provide too slow removal of copper to increase the size of pores in a dense layer in hollow fiber to the desired range. A sulfuric acid concentration of higher than 15% by volume is sufficient to increase the size of pores in a dense layer to the desired range, but would deteriorate the strength of hollow fibers and cause some problems in the following water washing step.

iii) Heat Treatment Step

As illustrated in FIG. 1, the hollow fiber 12 which has been washed is fed to a heat treating unit 16 through a drive roller 15 where the fiber is subject to heat treatment. The heat treating unit 16 is preferably of the construction that the hollow fiber 12 is heated by contacting it with heating fluid such as hot water and hot steam partly because of efficient heating. A typical example of the heat treating unit of such construction is illustrated in FIG. 2.

Figure 2:
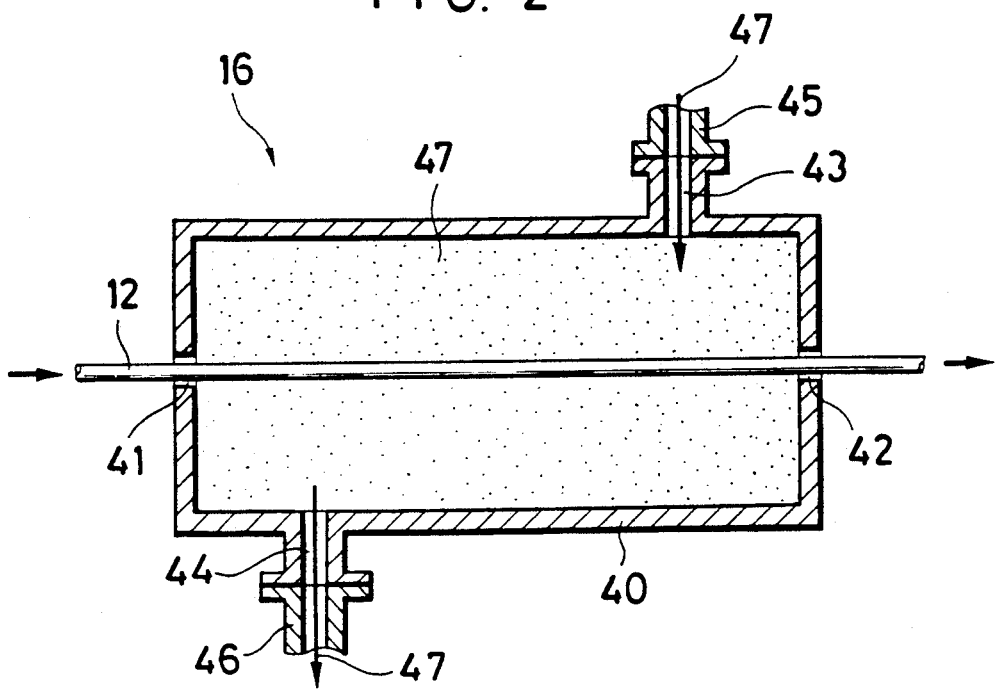
FIG. 2 is a cross sectional elevation of the heat treating unit in the system of FIG. 1.

The heat treating unit 16 includes a box-shaped housing 40 having at axially opposed ends (left and right ends in the figure) passage ports 41 and 42 through which the hollow fiber axially passes into and out of the housing 40 as shown in FIG. 2. The housing 40 is further provided at top and bottom walls with inlet and outlet ports 43 and 44 through which heating fluid such as hot water or steam enters and exits the housing 40.

Heating steam 47 produced in a steam generator (not shown) is fed to the unit through a conduit 45 and introduced into the housing 40 through the inlet 43, and then discharged to a conduit 46 through the outlet 44.

The hollow fiber 12 traveling from left to right in the figure enters the housing 40 through the passage port 41, comes in contact with the steam 47 for heating, and exits the housing 40 through the passage port 42.

The heat treatment of the hollow fiber 12 prior to plasticizing causes the hollow fiber to soften so that glycerin may be effectively taken in the matrix of the hollow fiber membrane during the subsequent plasticizing to maintain the once increased size of pores.

The heat treatment is preferably carried out at a temperature of 40° to 120° C. Temperatures below 40° C. would be too low for the heat treatment to be effective. Heat treatment at temperatures above 120° C. requires a special heating installation, undesirably adding to cost. The treating time at temperatures in the above-defined range preferably ranges from about 1 second to about 15 minutes although the time varies with the spinning speed, heat treating temperature, and other conditions.

Of course, the heat treating unit 16 is not limited to the illustrated construction. It may be any commonly used heating unit, for example, an enclosure covered with an electric heater.

It should be understood that the heat treating step may be omitted when the spinning dope is controlled to a viscosity of 100 to 800 P as previously described because the controlled viscosity of spinning dope can produce hollow fibers of the desired nature without an intermediate control or heat treatment.

iv) Plasticizing

Referring to FIG. 1 again, the hollow fiber 12 which has been heat treated when desired then enters a plasticizing unit 17 where the fiber is plasticized by contact with aqueous glycerin solution.

Figure 3:
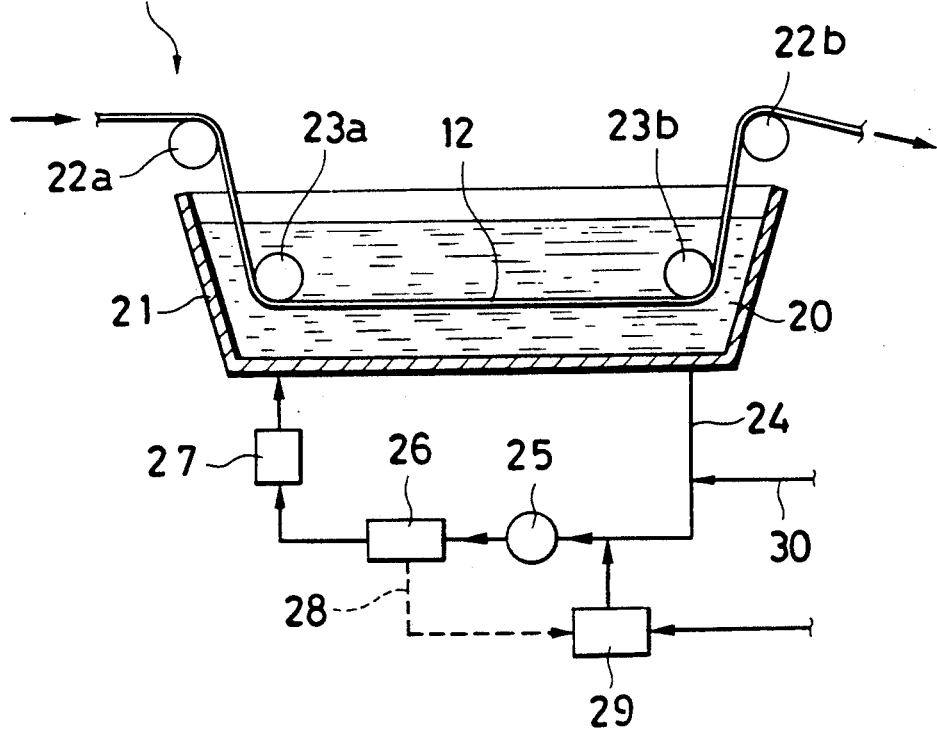
FIG. 3 is a cross sectional elevation of the plasticizing unit in the system of FIG. 1.

One preferred construction of the plasticizing unit is shown in FIG. 3. The plasticizing unit 17 includes a tub 21 filled with an aqueous glycerin solution 20. Drive rollers 22a and 22b are located above the tub 21 at its inlet and outlet sides, respectively, and turning rollers or bars 23a and 23b are located in the tub 21 at its inlet and outlet sides, respectively. The hollow fiber 12 which is fed from the left in the figure enters the glycerin solution 20 in the tub 21 through the inlet drive roller 22a, travels through the glycerin solution by way of the submerged rollers 23a and 23b, and is pulled out of the solution by the outlet drive roller 22b.

The glycerin solution is preferably kept at a predetermined concentration as will be defined later. A glycerin concentration control system is illustrated in FIG. 3 in connection with the tub 21 as a conduit 24 having a pump 25, a densitometer 26, and a heat exchanger 27 mounted therein. The glycerin solution is pumped from the tub 21 to the densitometer 26 through the conduit 24, heated to a predetermined temperature in the heat exchanger 27, and then fed back to the tub 21. The densitometer 26 may be a differential refractometer for concentration control, for example. When the glycerin concentration lowers, the densitometer 26 transmits a signal through a line 28 to a pump 29 which is connected to a source of fresh glycerin (not shown). Fresh glycerin is fed to the conduit 24 by the pump 29 in response to the signal. Conversely, if the glycerin concentration increases beyond the predetermined level, fresh water such as reverse-osmosis water is made up to the conduit 24 from a reverse-osmosis water supply line 30.

Figure 4:
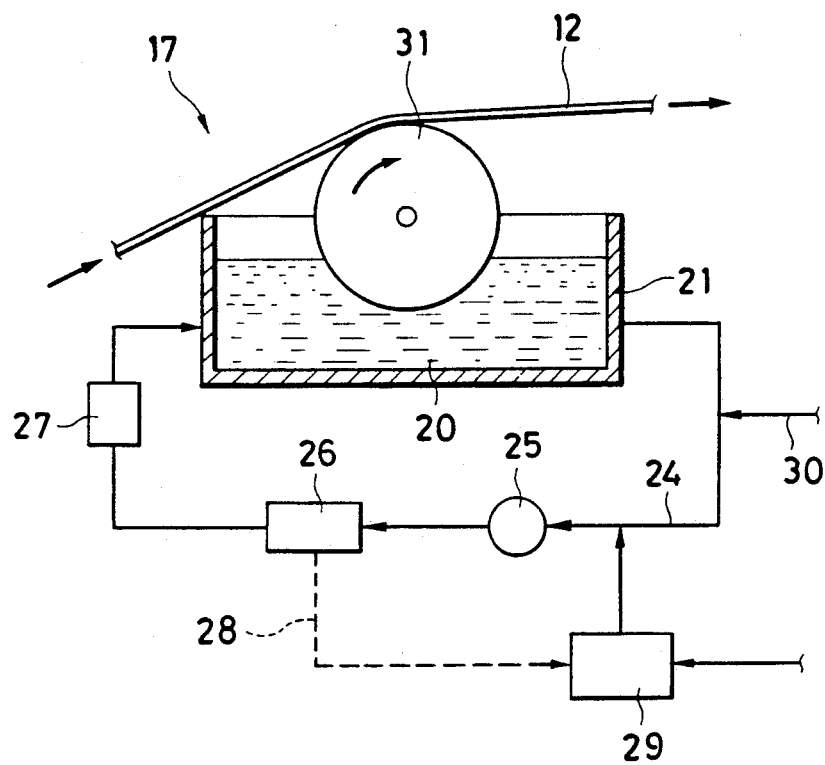
FIG. 4 is a cross sectional elevation showing another example of the plasticizing unit in the system of FIG. 1.

Another structure of the plasticizing apparatus 17 is illustrated in FIG. 4 as including a tub 21 filled with an aqueous glycerin solution and a drive roller 31 of a relatively large diameter disposed in the tub 21 and partially submerged in the glycerin solution. While the drive roller 31 is rotated in contact with the glycerin solution, the hollow fiber 12 is led in contact with the circumference of the roller 31, thereby contacting the fiber with the glycerin solution for plasticizing. This apparatus is also equipped with the same glycerin concentration control system as illustrated in FIG. 3.

The aqueous glycerin solution for plasticizing preferably has a glycerin concentration of 3 to 30% by volume, more preferably 5 to 20% by volume. A glycerin concentration of lower than 3% by volume would accomplish insufficient plasticizing, yielding hollow fiber membranes having low water removal capability. On the other hand, a glycerin concentration of higher than 30% by volume would accomplish excess plasticizing, yielding hollow fiber membranes which are undesirable for practical use because of hygroscopicity and prone to become defective upon potting during the manufacture of an artificial kidney.

The hollow fiber is contacted with an aqueous glycerin solution having the above-defined concentration, preferably for about $\frac{1}{2}$ to about 5 seconds, more preferably about 1 to about 4 seconds. The glycerin solution is preferably kept at a temperature of about 20° to about 60° C.

v) Drying Step

The hollow fiber 12 which has been plasticized then enters a drying unit 18 and is finally taken up on a spool unit 19.

The drying unit 18 includes a plurality of heaters 32 disposed therein in a staggered manner. The hollow fiber 12 is dried by bringing it in direct contact with the heaters 32. The heaters 32 may be of any desired structure inasmuch as the zones of the heaters in contact with the hollow fiber are kept at an optimum temperature at which the fiber itself is not damaged, for example, between 100° C. and 140° C., preferably between 110° C. and 130° C. For example, the heaters 32 may be a tubular structure through which heating fluid such as hot water and stream is passed to heat the contact zone to the optimum temperature, or a structure having an electric heater such as a heating coil disposed below the contact zone wherein electricity is applied to the heater. As to configuration, the heater 32 is preferably a rotary member such as a roller or ball whose contact zone will cause minimum abrasion to the hollow fiber upon contact therewith.

Figure 5:
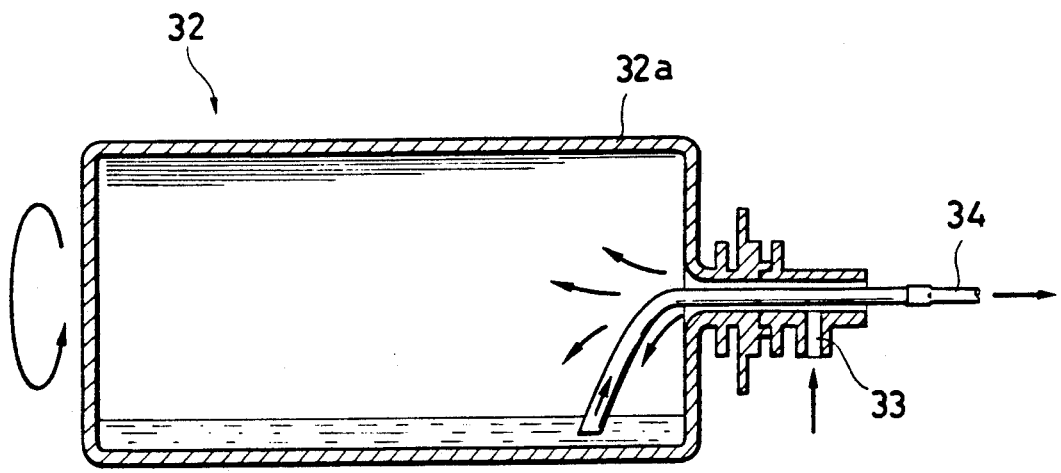
FIG. 5 is a cross sectional elevation of the heating unit in the system of FIG. 1.

One example of the heater 32 is shown in FIG. 5. This heater is a rotary roller into which steam is introduced. A hollow roller 32a is rotated about its shaft by suitable drive means such as a chain or belt (not shown). The shaft is provided with a port 33 for introducing steam into the interior space of the roller 32a to heat the roller wall. A drain tube 34 extends from the exterior to the roller interior space through the shaft for draining condensed water in the roller. The shaft may be of a rotary joint structure capable of connecting the steam inlet port 33 and drain port 34 to supply and drain lines, respectively. The hollow fiber is directly contacted with the outer circumference of the thus heated roller 32a.

Drying the hollow fiber 12 by direct contact with the heaters 32 has an advantage of minimizing the shrinkage of the hollow fiber because drying is briefly accomplished. In the embodiment of FIG. 1 wherein a plurality of roller type heaters 32 are arranged in the drying unit 18, the hollow fiber shrinks due to drying only over the area in contact with the sliding contact zones of the heating rollers 32. The limited shrinkage of the fiber little affects the tension on the fiber between the adjoining rollers 32, which can be kept at a minimal level necessary to convey the hollow fiber forward. When the hollow fiber is dried to a substantial extent by contact with the first heater 32, the fiber becomes fully resistant to external forces at this point, negating the influence by the tension between subsequent rollers.

There have been described hollow cellulosic fibers, a method for their preparation and a fluid processing apparatus using them, typically dialyzer. The hollow cellulosic fibers and artificial dialyzers have the following benefits when used in artificial dialysis.

1) The filtration fraction of $\beta_2$-microglobulin is high enough to prevent the occurrence of a complicating disease such as carpal tunnel syndrome.
2) The hollow-fiber membranes can remove $\beta_2$-microglobulin from blood without contamination of the membranes themselves due to adsorption of $\beta_2$-microglobulin thereto.
3) The reduced ultrafiltration rate allows the amount of water removed from blood to be minimized and thus the amount of make-up fluid to be minimized. The invention eliminates the use of a UFR controller having the risk of back filtration and thus ensures higher safety to the patient.

EXAMPLE

Examples of the invention are given below by way of illustration and not by way of limitation.

EXAMPLE 1

A copper ammonium solution was prepared by suspending 540 grams of basic copper sulfate in 2354 grams of 25% ammonia water. To the solution was added 1690 grams of a solution of 10% by volume of sodium sulfite in water. To the solution was added 2273 grams of hydrous linter (water content 69.7%) which was prepared by wet refining cotton linter pulp having a polymerization degree of about 1,000 (±100) followed by water removal. Reverse-osmosis water was added for concentration adjustment and the mixture was agitated until a solution was formed. Then 1233 grams of a solution of 10% by volume sodium hydroxide in water was added to the solution, obtaining a cuprammonium cellulose solution having a cellulose concentration of 8% by volume, a viscosity of 993 P at 20° C., and a specific gravity of 1.026, which was ready for use as the spinning dope.

A fiber preparing system as shown in FIG. 1 was used. The non-solidifying liquid 3 in the form of 1,1,1-trichloroethane was introduced into the inner tank 1 to form a lower layer while the solidifying liquid 4 in the form of a solution containing 50 grams of sodium hydroxide per liter of water was supplied to the tub 2 to form an upper layer.

The spinning dope was directly extruded upward into the lower layer or non-solidifying liquid 3 at a temperature of 20°±2° C. through the annular spinneret of the spinneret assembly 6, forming a hollow shape 8 of spinning dope. The spinneret had a diameter of 3.8 mm and the spinning dope was discharged at a rate of 5.86 ml/min. at 20° C.

Another non-solidifying liquid in the form of isopropyl myristate having a specific gravity of 0.854 was introduced into the bore of the hollow shape through the conduit 7 and the spinneret inner opening having a diameter of 1.2 mm. The isopropyl myristate was discharged at a rate of 1.50 ml/min.

The hollow shape 8 of spinning dope (specific gravity 1.026) moved upward through the outside non-solidifying liquid (1,1,1-trichloroethane) while entraining the inside non-solidifying liquid (isopropyl myristate) enclosed therein. The hollow shape then entered the upper layer of solidifying liquid (aqueous sodium hydroxide solution) at 20°±2° C. The hollow shape was then moved horizontally by turning around the bar 9. The first vertical path along which the hollow shape of spinning dope run through the non-solidifying liquid was 200 mm, the second vertical path along which the hollow shape run through the solidifying liquid from the interface between the non-solidifying liquid and the solidifying liquid to the turning bar 9 was 150 mm, and the horizontal path along which the shape or fiber run horizontally through the solidifying liquid was 4.4 m. The spinning speed was 60 m/min.

The fiber 12 was taken out of the solidifying liquid in the tub 2 through the rollers 10 and 11, and then randomly rested on the conveyor 13 where the fiber was showered with 1.5N sodium hydroxide solution for completing solidification, washed with water, showered with 5% by volume sulfuric acid for regeneration or copper removal, and then washed with water again.

The hollow fiber 12 then entered the heat treating unit 16 of the structure shown in FIG. 2 where the fiber was contacted with steam at 100° C. for 2 seconds.

The fiber 12 was immediately subjected to plasticization by introducing into the plasticizing unit 17 of the structure shown in FIG. 3 where the fiber was immersed for one second in an aqueous glycerin solution adjusted to a glycerin concentration of 10% by volume at a bath temperature of 30° C.

The fiber 12 then entered the drying unit 18 where the fiber was dried by contacting it with heating rollers 32 whose contact zones were heated to a temperature of 112° C. There was finally obtained a dry hollow fiber.

EXAMPLE 2

A hollow fiber was prepared by the same procedure as in Example 1 except that the cellulose solution was diluted with reverse osmosis water to a cellulose concentration of 6.0% by volume and a viscosity of 256 P and the heat treatment prior to plasticizing was omitted.

EXAMPLE 3

A hollow fiber was prepared by the same procedure as in Example 1 except that the cellulose solution was diluted with reverse osmosis water to a cellulose concentration of 6.5% by volume and a viscosity of 316 P before it was used as the spinning dope.

EXAMPLE 4

This example is outside the scope of the invention.

A hollow fiber was prepared by the same procedure as in Example 1 except that the heat treatment prior to plasticizing was omitted and the glycerin solution for plasticizing had a glycerin concentration of 9% by volume.

TEST 1

Small size dialyzers having a membrane surface area of 100 cm$^2$ were fabricated using the hollow fibers prepared in Examples 1-4. The dialyzers were subjected to the following test to determine the filtration fraction of $\beta_2$-microglobulin, with the results shown in Table 1.

Figure 6:
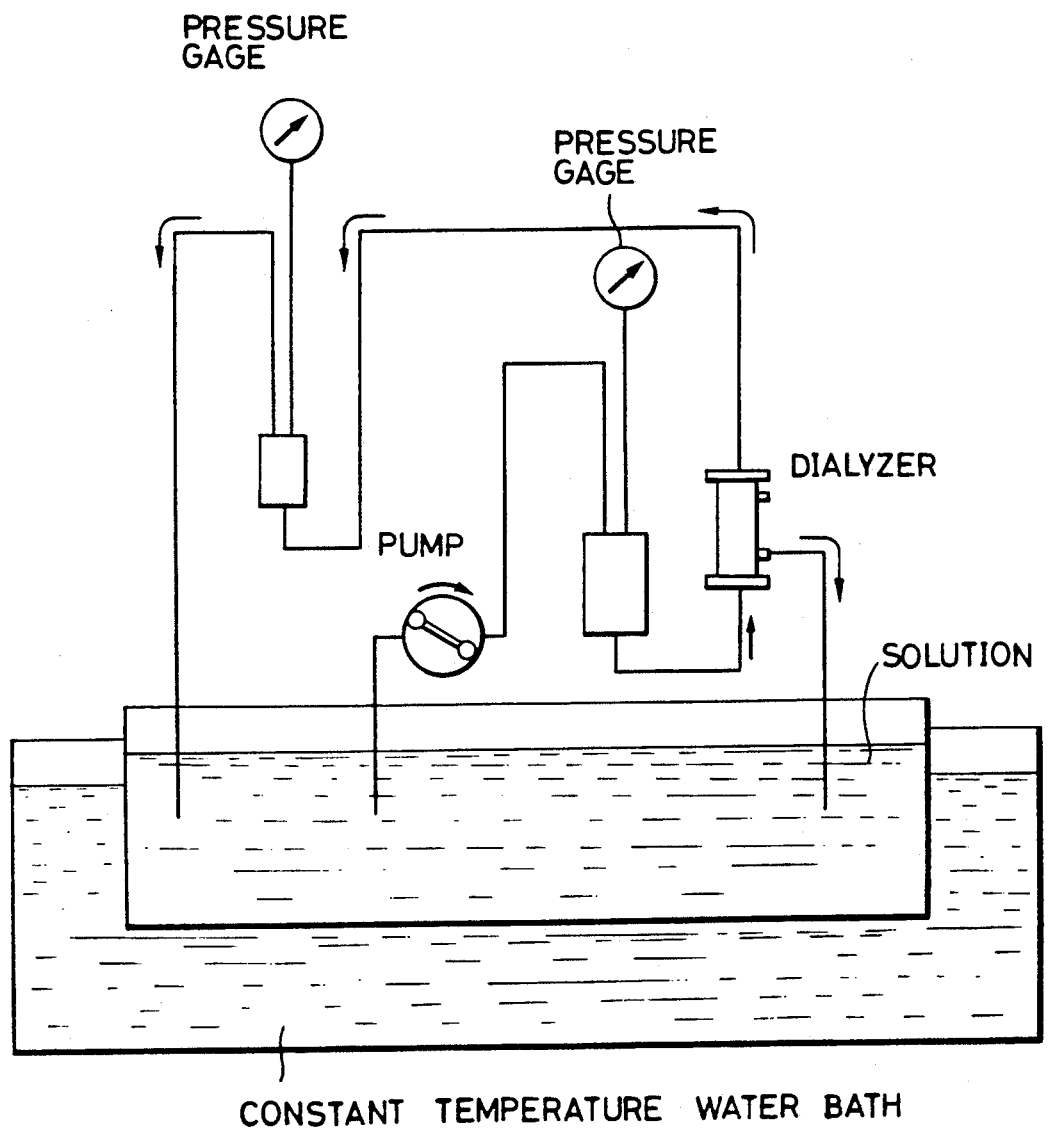
FIG. 6 is a schematic view of a fluid circuit used in a dialyzer examining test.

An experimental circuit was set up as shown in FIG. 6. A solution containing 20 mg/liter of $\beta_2$-microglobulin was circulated through the blood chamber (fiber bores) of the dialyzer for 1 hour at a flow rate of 10 ml/min. under a trans-membrane pressure of 100 mmHg. At the end of 1-hour operation, samples were taken out of the solutions at positions upstream and downstream of the dialyzer, which may be termed inlet solution and filtrate, respectively. The solution samples were analyzed for $\beta_2$-microglobulin fraction of $\beta_2$-microglobulin was the $\beta_2$-microglobulin concentration of the filtrate divided by that of the inlet solution both at the end of 1-hour operation.

$$\text{filtration fraction} = \frac{\text{filtrate concentration}}{\text{inlet concentration}} \times 100 \quad (1)$$

TABLE 1

| | Filtration fraction of $\beta_2$-microglobulin (%) |
|---|---|
| Example 1 | 50.8 ± 1.8 |
| Example 2 | 53.2 ± 2.5 |
| Example 3 | 64.0 ± 9.3 |
| Example 4 | 19.8 ± 0.4 |

It is to be noted that ± values are standard deviations.

TEST 2

Dialyzers having a membrane surface area of 1.2 m$^2$ were fabricated using the hollow fibers prepared in Examples 1-4. The ultrafiltration rate was measured according to the B method (ECUM method) prescribed by the Japan Prosthetic Society, with the results shown in Table 2.

TABLE 2

| | Ultrafiltration rate (ml/mm Hg · hr · m$^2$) |
|---|---|
| Example 1 | 10.8 ± 0.7 |
| Example 2 | 11.2 ± 0.5 |
| Example 3 | 13.1 ± 0.4 |
| Example 4 | 7.9 ± 0.2 |

It is to be noted that ± values are standard deviations.

TEST 3

Small size dialyzers having a membrane surface area of 100 cm$^2$ were fabricated using the hollow fibers prepared in Examples 1-4 and hollow fibers of polymethyl methacrylate (PMMA). The dialyzers were subjected to the following test to determine the percent removal of $\beta_2$-microglobulin through adsorption to the fiber membranes. The results were shown in Table 3.

A solution (30 ml) containing 20 mg/liter of $\beta_2$-microglobulin at a temperature of 37° C. was circulated across the dialyzer for 3 hours at a flow rate of 4 ml/min. under conditions prohibiting filtration. Samples were taken out of the solution prior to the operation (initial concentration) and the solution at the end of 3-hour operation. The solution samples were analyzed for $\beta_2$-microglobulin concentration by the EIA method. The percent removal of $\beta_2$-microglobulin through adsorption was determined according to the following formula:

Adsorptive removal (%) = (Cin − C3 hr)/Cin × 100 . . . (2) wherein Cin is the $\beta_2$-microglobulin concentration of the initial solution, and C3 hr is the $\beta_2$-microglobulin concentration of the solution at the end of 3-hour circulation.

TABLE 3

| | Adsorptive removal of $\beta_2$-microglobulin (%) |
|---|---|
| Example 1 | 3 ± 4 |
| Example 2 | 2 ± 5 |
| Example 3 | 1 ± 3 |
| Example 4 | 3 ± 5 |
| PMMA | 95 ± 4 |

It is to be noted that ± values are standard deviations.

As evident from Tables 1 and 2, the hollow fibers of Examples 1 to 3 according to the present invention exhibited an improved filtration fraction of $\beta_2$-microglobulin and a suppressed rise of ultrafiltration rate. The data of Table 3 show that little $\beta_2$-microglobulin was adsorbed to the hollow fiber membranes of Examples 1 to 3.

TEST 4

The hollow fibers of Examples 1 to 4 were measured for inner diameter and wall thickness using an optical microscope, model OPPIPHOT-POL ® by Nihon Optics K.K. The structure of a cross section of each fiber was observed under a field emission scanning electron microscope, model S-800 by Hitachi, Ltd. under an accelerating voltage of 5 kV with a magnifying power of ×90,000. In the hollow fibers of Examples 1-3, pores of an approximately equal diameter were formed in the radial or thickness direction of the membrane and the formation of a dense layer was observed on the inner surface of the membrane.

A photograph was taken on the inner surface of each fiber under a field emission electron microscope and subjected to image processing by means of an image analyzer, model TOSPIX-U by Toshiba Electric K.K., using a software designated particle analysis package (by Toshiba Electric K.K.). An average pore diameter was determined by averaging equivalent circle diameters calculated according to $R = \sqrt{4A/\pi}$ from pore areas A. The results are shown in Table 4.

TABLE 4

| | Inner diameter (μm) | Wall thickness (μm) | Average pore diameter (Å) |
|---|---|---|---|
| Example 1 | 210 | 17.8 | 74 |
| Example 2 | 150 | 10.3 | 87 |
| Example 3 | 196 | 9.7 | 111 |
| Example 4 | 200 | 17.0 | 51 |

These data show the effectiveness of the invention.

It was also found that dialyzers fabricated using the hollow-fiber membranes of Examples 1 to 3 showed good dialysis performance.

Although some preferred embodiments have been described, many modifications and variations may be made thereto in the light of the above teachings. It is therefore to be understood that within the scope of the appended claims, the invention may be practiced otherwise than as specifically described.

We claim:

1. A hollow cellulose fiber having outer and inner surfaces and micropores therein and defining a lumen, the micropores at the inner surface having an average pore diameter of about 55 to about 300 Å, a thickness of from 5 to 30 μm between the outer and inner surfaces and a filtration fraction of $\beta_2$-microgobulin of at least 45 percent, the fiber exhibiting a percent removal of $\beta_2$-microgolublin through adsorption of up to 10% after a solution of 20 mg/l of $\beta_2$-microglobulin in water is circulated through the fiber lumen for three hours.

2. The hollow cellulose fiber of claim 1 having an ultrafiltration rate of up to 20 ml/mmHg.hr.m$^2$.

* * * * *